United States Patent [19]

Yishay et al.

[11] Patent Number: 5,606,715
[45] Date of Patent: Feb. 25, 1997

[54] FLEXIBLE RESET CONFIGURATION OF A DATA PROCESSING SYSTEM AND METHOD THEREFOR

[75] Inventors: Oded Yishay; Daniel W. Pechonis; Joseph Jelemensky, all of Austin, Tex.

[73] Assignee: Motorola Inc., Schaumburg, Ill.

[21] Appl. No.: 639,461

[22] Filed: Apr. 29, 1996

Related U.S. Application Data

[63] Continuation-in-part of Ser. No. 494,664, Jun. 26, 1995.

[51] Int. Cl.[6] .................................................. G06F 13/00
[52] U.S. Cl. .................... 395/800; 364/232.9; 364/240.5; 364/264.1; 364/DIG. 1
[58] Field of Search .................................. 395/830, 834, 395/838, 309, 500, 182.03, 182.08, 182.21, 183.16, 734, 735, 775, 800; 370/85.1, 85.9, 85.13; 340/825.06; 371/11.3, 16.2

[56] References Cited

U.S. PATENT DOCUMENTS

| | | | |
|---|---|---|---|
| 4,272,829 | 6/1981 | Schmidt et al. | 395/800 |
| 4,697,140 | 9/1987 | Saito et al. | 324/78.1 |
| 5,438,672 | 8/1995 | Dey | 395/500 |
| 5,448,744 | 9/1995 | Eifert et al. | 395/800 |
| 5,483,660 | 1/1996 | Yishay et al. | 395/280 |
| 5,513,334 | 4/1996 | Alexander | 395/430 |
| 5,517,646 | 5/1996 | Piccirillo et al. | 395/700 |
| 5,522,086 | 5/1996 | Burton et al. | 395/829 |
| 5,555,432 | 9/1996 | Grochowski et al. | 395/775 |

*Primary Examiner*—Alpesh M. Shah

[57] ABSTRACT

A mask programmable register (40) determines a default configuration of a data processor during a reset operation. The default configuration is driven to a plurality of external integrated circuit pins (48) of the data processor with weak drivers (528, 534, 540, 546). Then, on an individual pin basis, an external user (11) may choose to allow each integrated circuit pin to remain in a default state or be drive with an external configuration value. When the external user chooses to allow the integrated circuit pin to remain in the default state, an internal default configuration data value provided by the internal mask programmable register is output by the integrated circuit pin. Conversely, when the external user chooses to override the default state, the user may drive the external configuration value to the integrated circuit pin using an external data source.

15 Claims, 6 Drawing Sheets

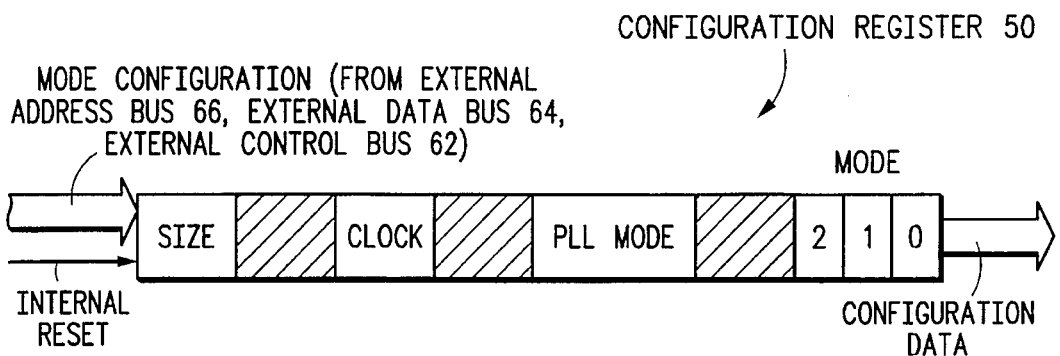
FIG. 5
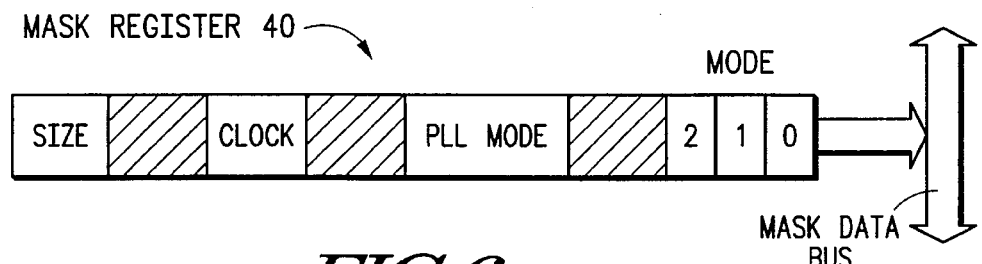
FIG. 6
| REGISTER FIELD AFFECTED | OVERRIDE PINS | EFFECT* |
|---|---|---|
| MODE | D[10, 1, 0] | 1 0 0 SLAVE ACCESS MODE<br>1 0 1 MASTER TEST MODE<br>0 X X EMULATOR MODE<br>1 0 1 MASTER MODE<br>1 1 0 SINGLE CHIP MODE |
| PLL MODE | FREEZE | 0 2:1 PLL MODE<br>1 1:1 PLL MODE |
| SIZE | SIZE | 0 16 BIT MODE<br>1 8 BIT MODE |
| CLOCK | D[3] | 0 PORT E[4]<br>1 CLOCK OUT |
FIG. 7

FLEXIBLE RESET CONFIGURATION OF A DATA PROCESSING SYSTEM AND METHOD THEREFOR

CONTINUATION IN PART

This application is a continuation-in-part of application Ser. No. 08/494,664, filed Jun. 26, 1995, by Oded Yishay et al., and assigned to the assignee hereof, entitled "Reset Configuration in a Data Processing System and Method Therefor."

FIELD OF THE INVENTION

The present invention relates to a data processor having a non-volatile memory register, in general, and more particularly, to a data processor having a mask programmed register for determining a reset configuration of the data processor.

BACKGROUND OF THE INVENTION

When a data processor is reset, the data processor is configured in a preselected reset configuration which depends on an application being performed by a data processor. Some data processors are configured for reset using a system integration module. Other data processors which have multiple modes of operation require multiple external integrated circuit pins to determine a reset configuration for a particular application. When a data processor is configured for reset in accordance with logic value driven to external integrated circuit pins, external circuitry is required to drive the logic values onto the integrated circuit pins. Furthermore, the logic values, or configuration data, must be removed from the integrated circuit pins after a reset operation is executed to allow for a normal mode of operation.

Additionally, a configuration for operation of the device after execution of the reset operation should be established during the reset operation since a data processing operation immediately following the reset operation may provide different results in different data processor configurations. For example, configuration data may be required to "tell" the data processor whether the first instruction after reset should be fetched from internal storage within the data processor or from a device external to the data processor. In another example, the configuration data may be required to "tell" the data processor whether a mode of operation is a multiplexed mode, where address signals, data signals, and optional control signals are provided on the same bus terminals at different times, or a non-multiplexed mode, where address signals, data signals, and control signals are provided on different bus terminals. When no configuration is specified during a reset operation, the data processor is typically placed in a default configuration.

An external user who desires to override the default configuration of a data processor generally uses an external circuit to drive appropriate reset configuration data onto the external integrated circuit pins of the data processor to configure the data processor in a desired manner. However, providing the external circuit significantly increases overhead costs associated with the data processor and may be prohibitive in some data processing environments. A new solution is required to provide for external reset configuration of a data processor in a cost effective manner. This statement is especially true for those users who require a high volume of data processors because they may be significantly more competitive if they are able to selectively eliminate the external circuit now required to drive reset configuration data onto external integrated circuit pins during a reset operation.

Such users have generally met their volume needs by requiring a manufacturer of the data processor to develop and manufacture a data processor that is tailored to their specifications. This tailored solution also requires the manufacturer to provide a circuit for selectively configuring the data processor to another configuration, even the default configuration, for any number of purposes which may be required for low volume users who cannot afford to require the manufacturer to tailor a data processor tailored to their specifications. As a compromise, the manufacturer may implement a register in an electrically erasable programmable read only memory (EEPROM) which may be programmed to configure the data processor to operate in a certain mode of operation. However, this EEPROM register is generally hard to test, requires a long time to program, and is more expensive to implement. Furthermore, programming the EEPROM register is another manufacturing step which may significantly increase the overhead costs associated with high volume users.

Therefore, there is a need for a data processor which may be easily configured during reset and which minimizes overhead costs of the data processor.

BRIEF DESCRIPTION OF THE DRAWINGS

FIG. 5 illustrates, in block diagram form, a configuration register of the system integration circuit illustrated in FIG. 2;

FIG. 6 illustrates, in block diagram form, a mask register of the system integration circuit illustrated in FIG. 2;

FIG. 7 illustrates, in table form, a default configuration during a reset operation in type data processing system of FIG. 1.

DESCRIPTION OF THE PREFERRED EMBODIMENTS

Figure 1:
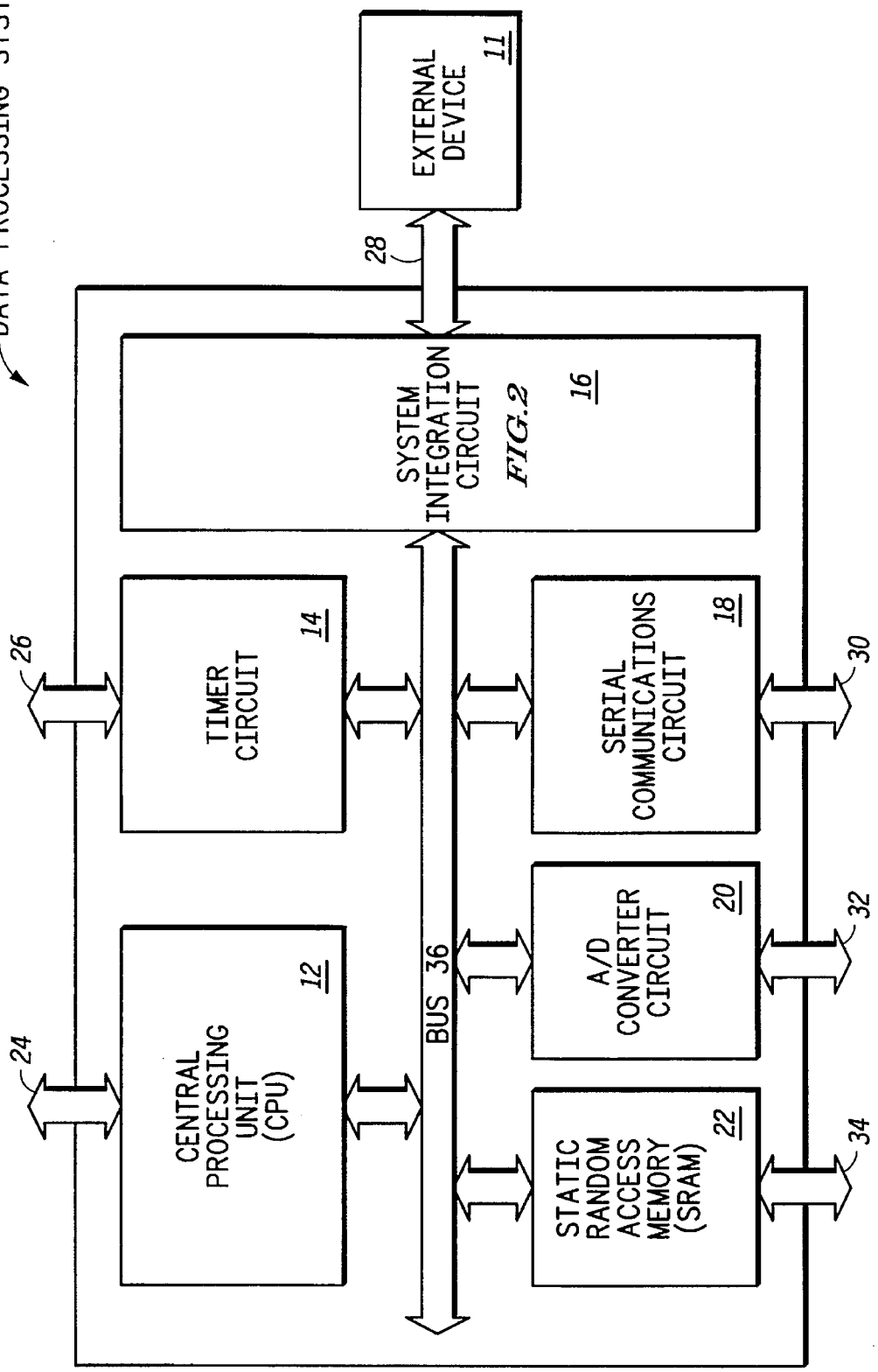
FIG. 1 illustrates, in block diagram form, a data processing system in accordance with one embodiment of the present invention.

The present invention provides an internal mask programmable register which determines an internal default configuration of a data processor during a reset operation. This default configuration is driven to a plurality of external integrated circuit pins of the data processor with a weak driver. Then, on an individual pin basis, an external user may choose to allow each integrated circuit pin to remain in a default state or be driven with an external configuration value. When the external user chooses to allow the integrated circuit pin to remain in the default state, an internal default configuration data value provided by the internal mask programmable register is output by the integrated circuit pin. Conversely, when the external user chooses to override the default state, the user may drive the external configuration value to the integrated circuit pin using an external data source. The default configuration data, which is provided by an internal mask programmable register or selectively overridden by the external user on a pin by pin basis, includes an external bus configuration, a clock configuration, a chip select configuration, and a port configuration.

A general description of the environment in which the present invention is implemented will now be discussed. During a reset operation, a configuration for the data processor will be determined because a first operation after reset may enable the data processor to function differently in different configurations. In the present invention, a default reset configuration of a data processor is accessed from the programmable mask register. Furthermore, the default reset configuration may be entirely or merely partially overridden by an external configuration value driven by an external user.

A general description of the environment in which the present invention is implemented will now be discussed. During a reset operation, a configuration of the data processor would be determined because a first operation after reset may enable the data processor to function differently in different configurations. In the present invention, a default reset configuration of a data processor is taken form the programmable mask register unless the default reset configuration is either entirely or partially overridden by an external source.

A customer which uses the data processor specifies the values to be programmed into the mask register during the fabrication process of the data processor. Optionally, the default reset configuration may be driven from external integrated circuit pins for applications such as production testing, development systems, prototypes, and for users who purchase data processors which may not have the required default reset configuration for their application. Circuitry implemented within a system integration circuit of the data processor allows an external user to selectively override the default configuration provided by the internal mask register on a pin by pin basis. Therefore, a user may choose to allow a portion of a reset configuration value to be provided by a default value stored in the internal mask register and a remaining portion of the reset configuration value to be driven externally by the external user.

The combined use of the mask programmable register and the ability of the user to override either all or a portion of the default configuration determined by the mask programmable register makes the present invention more cost effective than prior art implementations. For example, high volume users may eliminate external circuitry required to drive configuration data during execution of a reset operation and, therefore, reduce the cost of their data processing systems. Furthermore, the mask programmable register may be implemented by the manufacturer of the processor using known technology such that the data processor may be tailored to the specifications of such high volume users. Additionally, for specialized systems or low volume users, the manufacturer may implement an external data source to selectively override all or a portion of the reset configuration stored in the mask programmable register of the data processor.

The present invention allows the data processor to be selectively configured to the default configuration and any other configuration which may be required for testing purposes or any other operation which requires the default configuration to be overridden. The selectivity embodied by the data processor implementing the present invention is especially useful for low volume users who can not afford the expense of having a manufacturer design a data processor tailored to their specifications. Additionally, the ability of the present invention to selectively configure the data processor is useful for those users who want to use existing data processors as prototypes or for system development.

Note that during a following description of connectivity and operation of a data processor implementing the present invention, the term "during reset" refers to a period that a Reset signal is asserted. The term "normal operation" refers to a mode of operation of the data processor when the Reset signal is negated. Furthermore, in the following description of the present invention, the terms "overwritten," "overridden," and "overdriven" all imply the same meaning. In a following discussion, the connectivity and operation of the data processing which implements the present invention will be provided in greater detail.

CONNECTIVITY OF THE PRESENT INVENTION

In the following description of the connectivity of the present invention, the term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And, if the logically true state is a logic level a zero, the logically false state will be a logic level one.

Furthermore, the symbol "$" preceding a number indicates that the number is represented in its hexadecimal or base sixteen form. The symbol "%" preceding a number indicates that the number is represented in its binary or base two form.

FIG. 1 illustrates a data processing system 10. Data processing system 10 communicates with an external device 11 via a bus 28. Bus 28 may be used interchangeably with a plurality of integrated circuit terminals 28 in the present document. Data processing system 10 includes a central processing unit (CPU) 12, a timer circuit 14, a system integration circuit 16, a serial communications circuit 18, an analog to digital (A/D) converter 20, and a static random access memory (SRAM) 22. Each of CPU 12, timer circuit 14, system integration circuit 16, serial communications circuit 18, A/D converter 20, and SRAM 22 communicate internally via a bus 36.

Figure 2:
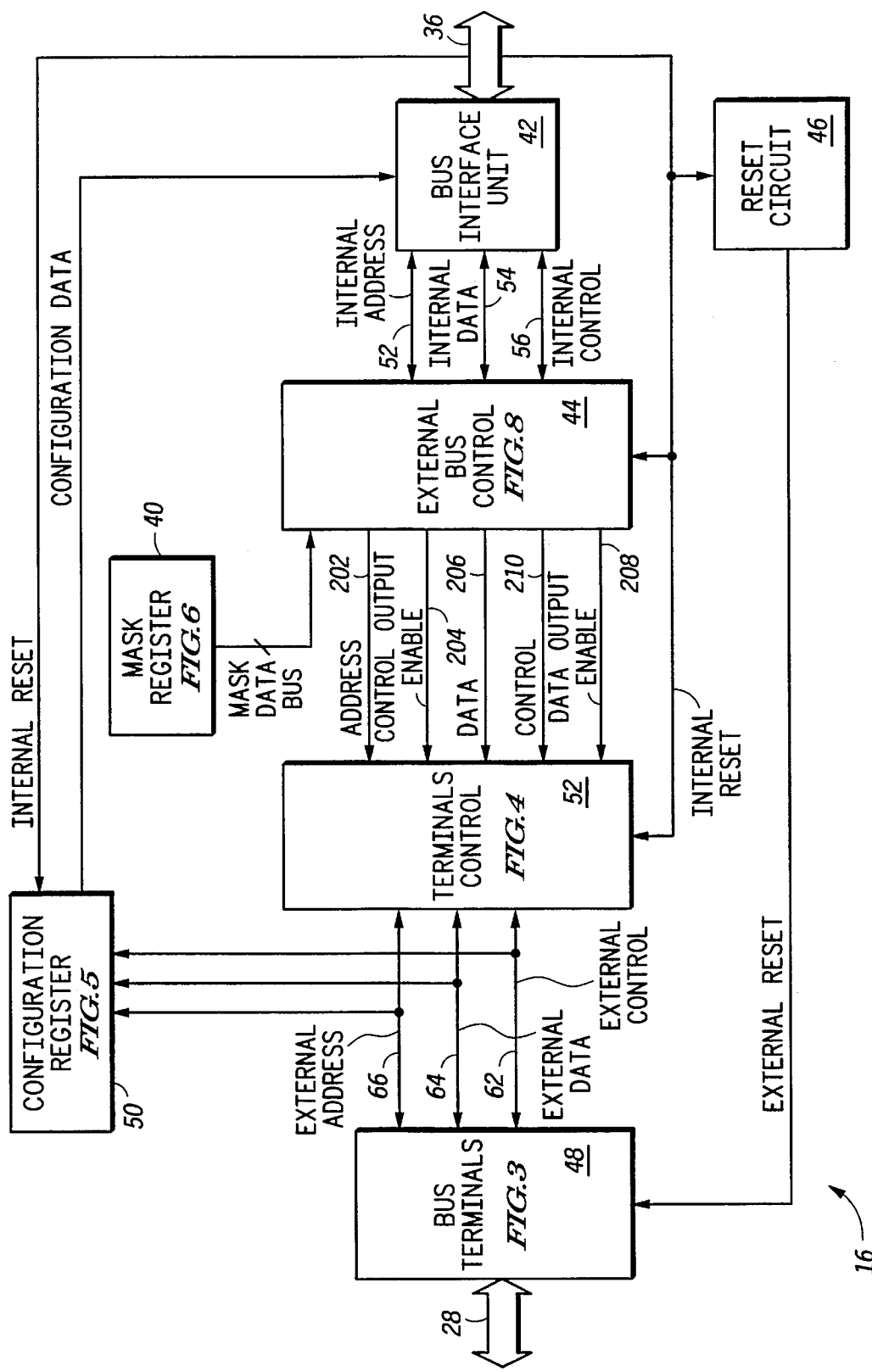
FIG. 2 illustrates, in block diagram form, a portion of a system integration circuit of the data processing system of FIG. 1.

FIG. 2 illustrates a portion of system integration circuit 16 of data processing system 10 utilizing the present invention. System integration circuit 16 includes a mask register 40, a bus interface unit 42, an external bus control 44, a reset circuit 46, a plurality of bus terminals 48, a configuration register 50, and a terminals control circuit 52. Bus interface unit 42 of system integration circuit 16 is coupled to a remaining portion of data processing system 10 via bus 36. Bus interface unit 42 is coupled to external bus control 44 via an Internal Address bus 52, an Internal Data bus 54, and an Internal Control bus 56.

Configuration register 50 is coupled to reset circuit 46 to receive an Internal Reset signal. Configuration register 50 is also coupled to bus interface unit 42 to provide a Configuration Data bus. Configuration register 50 is coupled to the plurality of bus terminals 48 via an External Address bus 66, an External Data bus 64, and an External Control bus 62.

Mask register 40 is coupled to external bus control 44 to provide a Mask Data bus. External bus control 44 is coupled to terminals control 52 to provide an Address bus 202, a Control Output Enable bus 204, a Data bus 206, a Control bus 210, and a Data Output Enable signal 208. Reset circuit 46 is coupled to external bus control 44 and terminals control 52 to provide an Internal Reset signal. Reset circuit 46 is also coupled to the plurality of bus terminals 48 to bidirectionally communicate an External Reset signal. The plurality of bus terminals 48 is coupled to terminals control 52 to bidirectionally communicate information via External Address bus 66, External Data bus 64, and External Control bus 62. The plurality of bus terminals 48 provide information via the plurality of integrated circuit pins 28.

Figure 3:
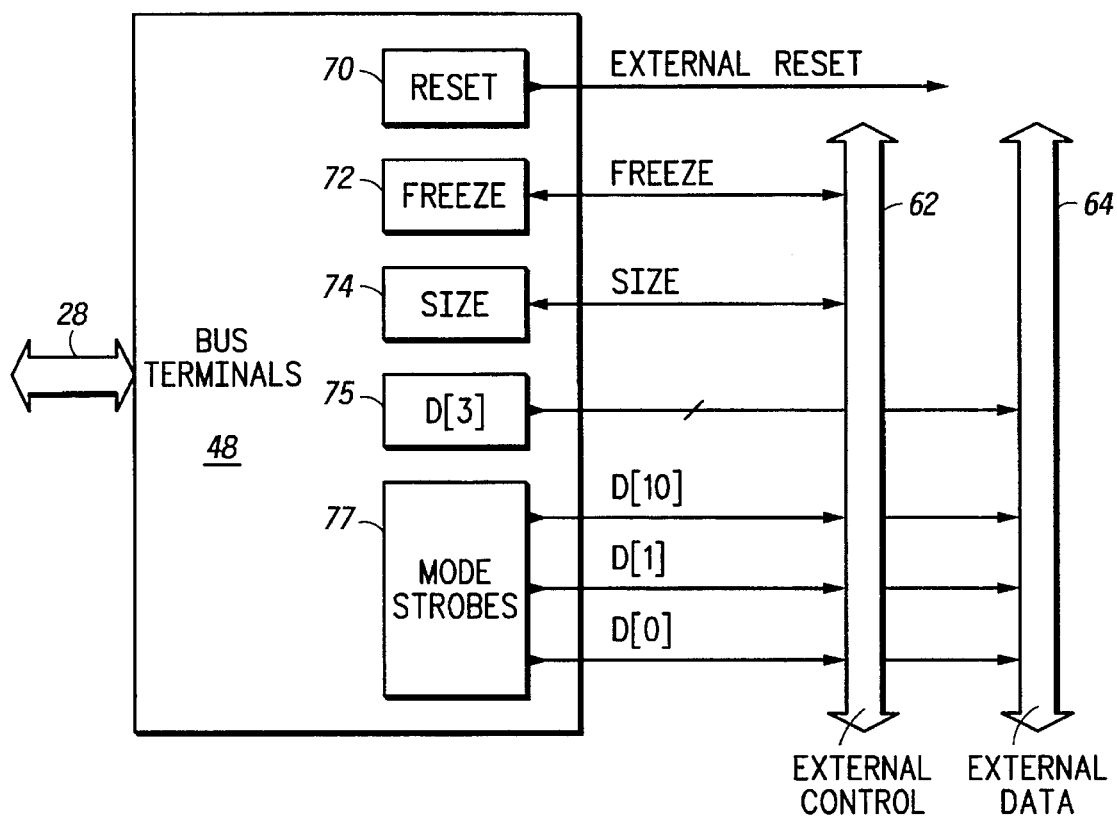
FIG. 3 illustrates, in block diagram form, a plurality of bus terminals of the system integration circuit illustrated in FIG. 2.

A portion of the plurality of bus terminals 48 is illustrated in greater detail in FIG. 3. The plurality of bus terminals 48 comprise a reset terminal 70, a Freeze terminal 72, a Size terminal 74, and, a plurality of Mode Strobes terminals 77, and a Mode Select terminal 78. The plurality of Mode Strobes terminals 77 provides a D[10] signal, a D[1] signal, and a D[0] signal to External Data bus 64. Mode Select terminal 78 provides a Mode Select signal to External Control bus 62. Freeze terminal 72 provides a Freeze signal to External Control bus 62. Additionally, Size terminal 74 provides a Size signal to External Control bus 62. The Reset terminal 70 provides the External Reset signal to reset circuit 46. The plurality of bus terminals 48 are also coupled to external device 11 via the plurality of integrated circuit terminals 28.

Figure 4:
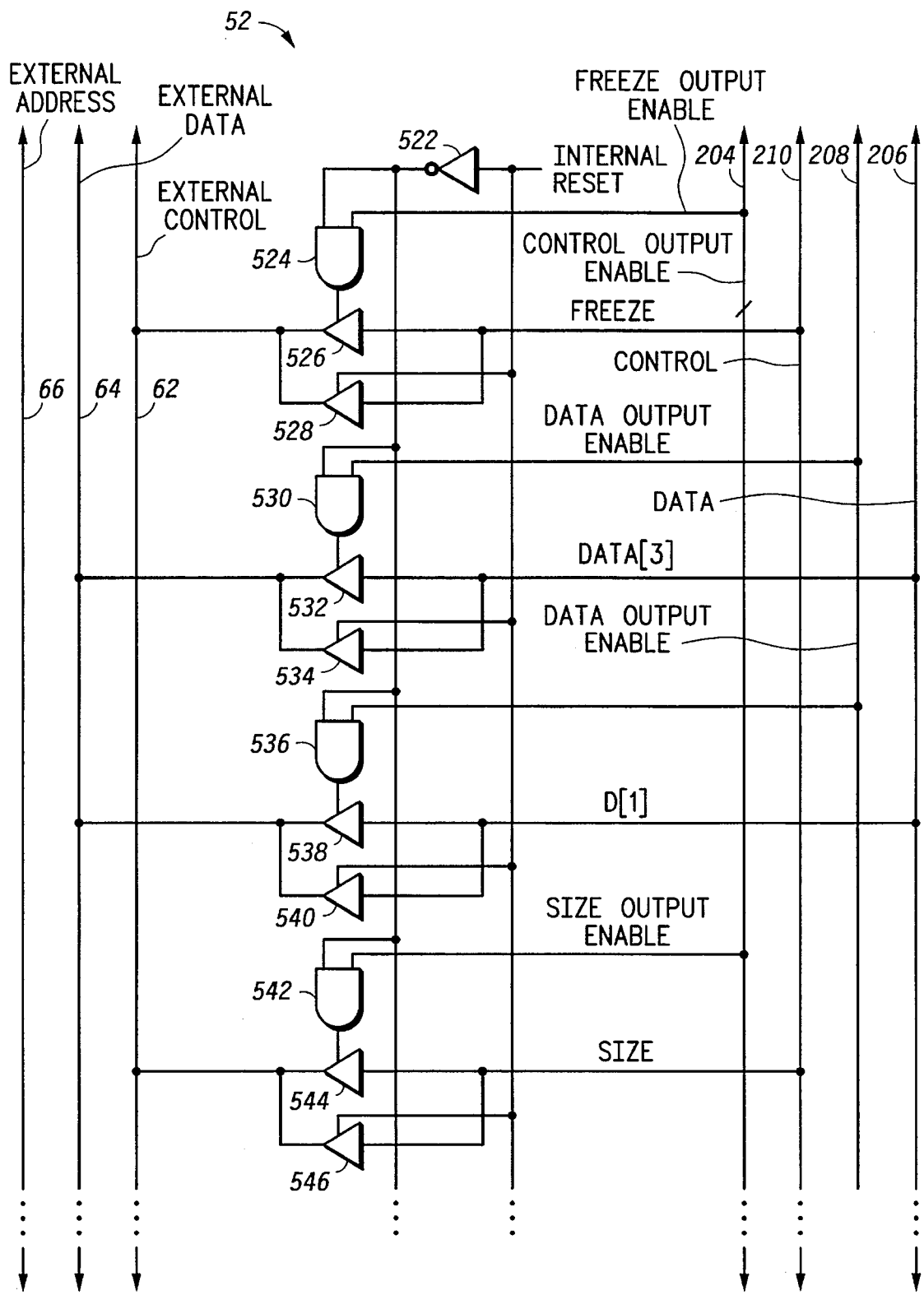
FIG. 4 illustrates, in block diagram form, a terminals control circuit of the system integration circuit illustrated in FIG. 2.

FIG. 4 illustrates a portion of terminals control 52 in greater detail. The portion of terminals control 52 comprises an inverter 522, an AND gate 524, a buffer 526, a buffer 528, an AND gate 530, a buffer 532, a buffer 534, an AND gate 536, a buffer 538, a buffer 540, an AND gate 542, a buffer 544, and a buffer 546.

Inverter 522 is coupled to reset circuit 46 to receive the Internal Reset signal at a first input. The Internal Reset signal is also provided to a control input of each of buffer 528, buffer 534, buffer 540, and buffer 546. An output of inverter 522 is coupled to a first input of each of AND gate 524, AND gate 530, AND gate 536, and AND gate 542.

A second input of AND gate 524 is coupled to Control Output Enable bus 204. An output of AND gate 524 is coupled to a control input of buffer 526. Control bus 210 provides a Freeze signal to an input of buffer 526 and an input of buffer 528. An output of buffer 526 and an output of buffer 528 are coupled to External Control bus 62.

A second input of AND gate 530 is coupled to Data Output Enable signal 208. An output of AND gate 530 is coupled to a control input of buffer 532. Data bus 206 provides a Data[3] signal to an input of buffer 532 and an input of buffer 534. An output of buffer 532 and an output of buffer 534 are coupled to External Data bus 64.

A second input of AND gate 536 is coupled to a Data Output Enable signal 208. An output of AND gate 536 is coupled to a control input of buffer 538. Data bus 206 provides a Data[1] signal to an input of buffer 538 and an input of buffer 540. An output of buffer 538 and an output of buffer 540 are coupled to External Data bus 64.

A second input of AND gate 542 is coupled to a Size Output Enable signal provided by Control Output Enable bus 204. An output of AND gate 542 is coupled to a control input of buffer 544. Control bus 210 provides a Size signal to an input of buffer 544 and an input of buffer 546. An output of buffer 544 and an output of buffer 546 are coupled to External Control bus 62.

Figure 8:
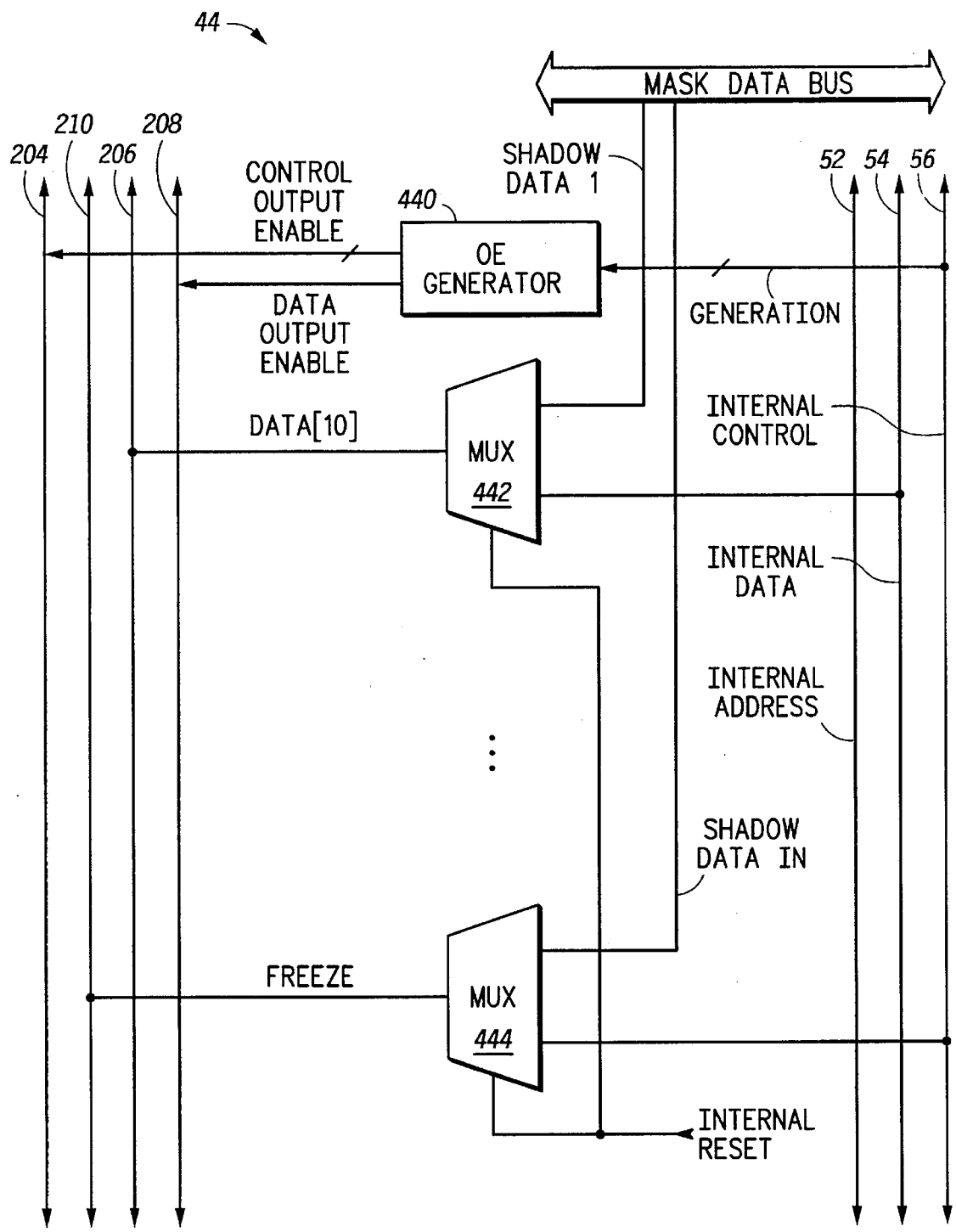
FIG. 8 illustrates, in block diagram form, an external bus control circuit of the system integration circuit illustrated in FIG. 2.

FIG. 8 illustrates a portion of external bus control 44 in greater detail. The portion of external bus control 44 comprises an OE (Output Enable) Generator 440, a multiplexer 442, and a multiplexer 444.

The Mask Data bus provides shadow data to each of the plurality of multiplexers 442 through 444. For clarity's sake, only two multiplexers are used to represent a plurality of multiplexers actually implemented in the present invention. Therefore, a Shadow Data 1 signal is provided to multiplexer 442 and a Shadow Data N signal is provided to multiplexer 444. A Generation bus is provided to OE generator 440 via Internal Control bus 56. A data value is provided to multiplexer 442 via Internal Data bus 54. A control value is provided to multiplexer 444 via Internal Control bus 56. The Internal Reset signal is provided to a control input of each of multiplexers 442 through 444. OE generator 440 provides Control Output Enable bus 204 and a Data Output Enable signal 208. Multiplexer 442 provides a D[10] data value to Data bus 206. Multiplexer 444 provides a Freeze signal to Control bus 210.

DESCRIPTION OF OPERATION

During operation of data processing system 10 illustrated in FIG. 1, CPU 12 controls operation of each of timer circuit 14, system integration circuit 16, serial circuit 18, A/D converter circuit 20, and SRAM 22 via a plurality of address, data, and control signals transferred via Bus 36. CPU 12 executes each of the instructions required during operation of data processing system 10. Bus 36 communicates information between CPU 12 and a remaining portion of data processing system 10. Furthermore, timer 14 provides timing control and interrupt features. The timing control and interrupt features are generally well known in the data processing art and will not be discussed in further detail. Serial circuit 18 communicates serial data. A/D converter 20 executes analog to digital conversion operations in response to data provided by an external source via the plurality of external integrated circuit pins 32. SRAM 22 provides memory storage for functions executed during operation of data processing system 10. Additionally, system integration circuit 16 allows interaction between data processing system 10 and a plurality of other external devices, including external device 11.

A portion of system integration circuit 16, illustrated in more detail in FIG. 2, determines whether data processing system 10 should be configured according to a default reset configuration stored in a mask register or according to external data provided by to the plurality of bus terminals via bus 28. During operation of data processing system 10, a reset operation may be generated either internally or externally to system integration circuit 16. Externally generated reset operations begin when external device 11 asserts reset integrated circuit terminal 70 (of FIG. 3) of the plurality of bus terminals 48. Reset integrated circuit terminal 70 provides the External Reset signal in response thereto. Subsequently, the External Reset signal is transferred to reset circuit 46 and reset circuit 46 asserts the Internal Reset signal. Likewise, an internally generated reset operation may be generated by any module of data processing system 10. Such an internal reset request may be provided to bus interface unit 42 via Bus 36. Alternately, the internal reset request may be generated directly by a requesting module or submodule of data processing system 10. In response to such an internal reset request (not illustrated herein), reset circuit 46 asserts both the Internal Reset signal and the External Reset signal. Where both external and internal reset operations are initiated, the Internal Reset signal, the External Reset signal, and reset integrated circuit terminal 70 are asserted.

During operation of the present invention, data processing system 10 is configured for a desired mode of operation when external reset integrated circuit pin 70 is asserted. These modes may include a slave factory test mode, a master test mode, an emulator mode, a master mode, and a single chip mode. In addition to a mode of operation, a PLL (Phase Lock Loop) mode, a Size mode, and a Clock mode of data processing system 10 are also determined when external reset integrated circuit pin 70 is asserted. Data processing system 10 may be configured to operate in a 2:1 PLL mode or a 1:1 PLL mode. Similarly, data processing system 10 may be configured to operate in a 16 bit or an 8 bit size mode. Likewise, a clock mode which enables a preselected integrated circuit pin to operate as a port (PORT E[4]) or as a clock output is also determined when external reset integrated circuit pin 70 is asserted. It should be well understood that the modes described above merely illustrate one embodiment of the present invention and may be supplemented with additional modes of operation and different configurations within each mode of operation.

To determine a mode of operation and configuration of data processing system 10, an external user may either use a default reset configuration provided by internal mask register 40 or may, on an individual integrated circuit pin basis, choose to override the default reset configuration data provided to that pin by driving alternate data to the integrated circuit pin from an external source. Stated another way, if the external user desires to use the default reset configuration state implemented by data provided by internal mask register 40, no action is required. The default reset configuration provided by internal mask register 40 is used to configure the attributes of the operation of data processing system 10. However, if an external user desires to change all or just a portion of the configuration specified by the default reset configuration data stored in mask register 40, the external user may override the default data by driving alternate data to either all or the specified one of the plurality of integrated circuit pins.

Assume in a first example that a reset operation is being executed and configuration data is retrieved from mask register 40 and transferred to external bus control 44 via the Mask Data bus. As illustrated in FIG. 8, external bus control 44 retrieves a Generation bus from Internal Control bus 56. When the first control signal is retrieved, it is provided to OE (Output Enable) generator 440 to generate Control Output Enable bus 204.

Additionally, external bus control 44 retrieves a first data bit, Shadow Data 1, from the Mask Data bus. The Shadow Data 1 bit is provided to the first input of multiplexer 442. Additionally, a corresponding data bit is provided to the second input of multiplexer 442 by Internal Data bus 54. The Internal Reset signal, provided by reset circuit 46, is provided to determine which of the Shadow Data 1 bit and the corresponding data bit will be provided via Data bus 206. When the Internal Reset signal is asserted to indicate that data processing system 10 has been reset and needs to be configured, multiplexer 442 provides the Shadow Data 1 bit to terminals control 52 via Data bus 206. At all other times, when the Internal Reset signal is negated, multiplexer 442 provides the corresponding data bit to Data bus 206.

Similarly, external bus control 44 retrieves a last data bit, Shadow Data N, from the Mask Data bus. The Shadow Data N bit is provided to the first input of multiplexer 444. Additionally, a corresponding control bit is provided to the second input of multiplexer 444 by Internal Control bus 56. The Internal Reset signal, provided by reset circuit 46, is provided to determine which of the Shadow Data N bit and the corresponding control bit will be provided via Data bus 206. When the Internal Reset signal is asserted to indicate that data processing system 10 has been reset and needs to be configured, multiplexer 444 provides the Shadow Data N bit as the Freeze signal to terminals control 52 via Control bus 210. At all other times, when the Internal Reset signal is negated, multiplexer 444 provides the corresponding control bit to Control bus 210.

Although not specifically illustrated in FIG. 8 in detail, it should be understood that additional multiplexers are implemented in external bus control 44 to provide for the provision of configuration data to a remaining portion of data processing system. Therefore, additional multiplexers will be provided for determining a mode of operation, a PLL mode, a Size mode, and a Clock mode of data processing system 10. An effect of external bus control 44 is to provide all default configuration data provided by mask register 40 to terminals control 52 via one of Control Output Enable bus 204, Data bus 206, Control bus 210, and Data Output Enable signal 208 when the Internal Reset signal is asserted.

When the default configuration data is provided to terminals control 52, terminals control 52 weakly drives the default data provided by mask register 40 and external bus control 44. This weakly driven default data will be used to provide configuration data to data processing system 10 unless portions of that default data are overdriven by external configuration data provided by a source external to data processing system 10.

As previously described, terminals control 52 receives internal configuration data from external bus control 44. The internal configuration data includes the Freeze signal, the Data [3] signal, the D[10] signal, the D[1] signal, the D[0] signal, and the Size signal. Again, it should be noted that each of these signals is provided by a multiplexer implemented in external bus control 44. Furthermore, external configuration data may be retrieved from the plurality of bus terminals 48 via the External Address bus 66, the External Data bus 64, and the External Control bus 62. The external configuration data is provided to the plurality of bus terminals 48 illustrated in FIG. 3. Each of the plurality of bus terminals 48 is then connected with an appropriate one of External Control bus 62 and External Data bus 64. Reset terminal 70 provides the External Reset signal to reset circuit 46.

It is important to note that each of buffers 526, 532, 538, and 544 is a strong driver which is able to drive information to one of External Address bus 66, External Data bus 64, and External Control bus 62. Similarly, it is important to note that each of buffers 528, 534, 540, and 546 is a weak driver which will weakly provide information to one of External Address bus 66, External Data bus 64, and External Control bus 62, and may be overridden by information provided externally by the plurality of bus terminals 48.

During operation of the present invention, the Internal Reset signal is provided to terminals control 52..The Internal Reset signal is provided to enable each of buffers 528, 534, 540, and 546 to transfer data. Additionally, the Internal Reset signal is inverted and provided to each of AND gates 524, 530, 536, and 542. When the Internal Reset signal is negated, AND gate 524 disables buffer 526. Similarly, when the Internal Reset signal is negated, AND gate 530 disables buffer 532, AND gate 536 disables buffer 538, and AND gate 542 disables buffer 544.

When the Internal Reset signal is negated and the strong drivers provided by buffers 526, 532, 536, and 544 are disabled, the default configuration information provided by external bus control 44 is driven to one of External Address bus 66, External Data bus 64, and External Control bus 62 by a respective one of the weak drivers formed by buffer 528, 534, 540, and 546. When the default configuration information is driven by such a weak driver, it may be easily overridden by a value driven on one of the plurality of bus terminals 48.

An example of operation of one embodiment of the present invention will now be described in greater detail. Refer to FIG. 7 for a tabular representation of the configuration possibilities implemented in the present invention. As is illustrated in FIG. 7, assume that a mode of a data processing system is, by default, configured to operate in a master mode upon reset. Thus, mask register 40 will store a binary value of %101 in bits 0 through two. When the Internal Reset signal is asserted to indicate data processing system 10 has been reset and should be configured, the binary value of %101 is provided to external bus control 44 via the Mask Data bus. Because the Internal Reset signal is asserted, the binary value of %101 is provided to and subsequently output via a corresponding plurality of multiplexers (not illustrated in detail in FIG. 8). The multiplexers provide the binary value to Data bus 206 in the present embodiment of the invention.

From the corresponding plurality of multiplexers, the binary value of %101 is provided to terminals control 52 via Data bus 206. Note, the binary value which determines a mode of operation of data processing system 10 may be overdriven with information driven to the Mode Strobes integrated circuit terminals 77 by an external device such as external device 11. If external device 11 does not provide data to the plurality of Mode Strobes integrated circuit terminals 77, the binary value of %101 is output and weakly driven from buffers implemented in terminals control 52. Subsequently, the binary value of %101 is provided to and stored in bits 0 through two of configuration register 50 via External Data bus 64. From configuration register 50, this value is used to configure data processing system to operate in a master mode of operation.

In contrast, assume external device 11 does provide information to the plurality of Mode Strobes integrated circuit terminals 77 which indicates an external user wants data processing system 10 to operate in a single chip mode rather than a master mode. Therefore, the Mode Strobes integrated circuit terminals 77 provides a binary value of %110 to indicate data processing system should operate in a single chip mode of Operation. In this instance, the binary value of %101 is still output and weakly driven from the buffers implemented in terminals control 52. However, the weakly driven value of %101 is overwritten by the binary value of %110 provided by the Mode Strobes integrated circuit terminals 77. The value provided by the Mode Strobes integrated circuit terminals 77 overrides the weak value driven by the buffers implemented in terminals control 52. Subsequently, the binary value of %110 is provided to and stored in bits 0 through two of configuration register 50 via External Data bus 64. From configuration register 50, this value is used to configure data processing system to operate in a single chip mode of operation.

As a second example of operation of one embodiment, assume that a phase lock loop of a data processing system is, by default, configured to operate in a 2:1 mode upon reset. Thus, mask register 40 will store a binary value of %0 in a PLL Mode bit of mask register 40. When the Internal Reset signal is asserted to indicate data processing system 10 has been reset and should be configured, the binary value of %0 is provided to external bus control 44 via the Mask Data bus. Because the Internal Reset signal is asserted, the binary value of %0 is provided to and subsequently output via multiplexer 444. Multiplexer 444 provides the binary value to Control bus 210 via the Freeze signal in the present embodiment of the invention.

Note, the binary value which determines the PLL mode of operation of data processing system 10 may be overwritten with a value written to Freeze integrated circuit terminal 72 by an external device such as external device 11. If external device 11 does not provide a value to the Freeze integrated circuit terminal 72, the binary value of %0 is output and weakly driven from buffer 528. Subsequently, the binary value of %0 is provided to and stored in the PLL mode bit of configuration register 50 via External Control bus 62. From configuration register 50, this value is used to configure data processing system 10 to operate in a 2:1 PLL mode of operation.

In contrast, assume external device 11 does provide a value to Freeze integrated circuit terminal 72 which indicates an external user wants data processing system 10 to operate in a 1:1 PLL mode rather than a 2:1 PLL mode. Therefore, Freeze integrated circuit terminal 72 provides a binary value of %1 to indicate data processing system should operate in a 1:1 PLL mode of operation. In this instance, the binary value of %0 is still output and weakly driven from buffer 528. However, the weakly driven value of %0 is overwritten by the binary value of %1 provided by Freeze integrated circuit terminal 72. The value provided by Freeze integrated circuit terminal 72 overrides the value driven by the weak driver, buffer 528. Subsequently, the binary value of %1 is provided to and stored in the PLL mode bits of configuration register 50 via External Control bus 62. From configuration register 50, this value is used to configure data processing system 10 to operate in a 1:1 PLL mode of operation.

As a third example of operation of one embodiment, assume that data processing system 10 is, by default, configured to operate in a 16 bit Size mode upon reset. Thus, mask register 40 will store a binary value of %0 in a Size mode bit of mask register 40. When the Internal Reset signal is asserted to indicate data processing system 10 has been reset and should be configured, the binary value of %0 is provided to external bus control 44 via the Mask Data bus. Because the Internal Reset signal is asserted, the binary value of %0 is provided to and subsequently output via one of the plurality of multiplexers (not illustrated in detail herein) of external bus control 44. This multiplexer subsequently provides the binary value to Control bus 210 via the Size signal in the present embodiment of the invention.

Note, the binary value which determines the Size mode of operation of data processing system 10 may be overwritten with a value written to Size integrated circuit terminal 74 by an external device such as external device 11. If external device 11 does not provide a value to the Size integrated circuit terminal 74, the binary value of %0 is output and weakly driven from buffer 528. Subsequently, the binary value of %0 is provided to and stored in the Size mode bit of configuration register 50 via External Control bus 62. From configuration register 50, this value is used to configure data processing system to operate in a 16 bit Size mode of operation.

In contrast, assume external device 11 does provide a value to Size integrated circuit terminal 74 which indicates an external user wants data processing system 10 to operate in a 8 bit Size mode rather than a 16 bit Size mode. Therefore, Size integrated circuit terminal 74 provides a binary value of %1 to indicate data processing system should operate in a 8 bit Size mode of operation. In this instance, the binary value of %0 is still output and weakly driven from buffer 546. However, the weakly driven value of %0 is overwritten by the binary value of %1 provided by Size integrated circuit terminal 74. The value provided by Size integrated circuit terminal 74 overrides the value driven by the weak driver, buffer 546. Subsequently, the binary value of %1 is provided to and stored in the Size mode bit of configuration register 50 via External Control bus 62. From configuration register 50, this value is used to configure data processing system to operate in a 8 bit Size mode of operation.

As a fourth example of operation of one embodiment, assume that an output of a data processing system is, by default, configured to operate in as a port terminal (Port E[4]) upon reset. Thus, mask register 40 will store a binary value of %0 in a Clock bit of mask register 40. When the Internal Reset signal is asserted to indicate data processing system 10 has been reset and should be configured, the binary value of %0 is provided to external bus control 44 via the Mask Data bus. Because the Internal Reset signal is asserted, the binary value of %0 is provided to and subsequently output via one of the plurality of multiplexers (not illustrated in detail herein). The one of the plurality of multiplexers provides the binary value to Data bus 206 in the present embodiment of the invention.

Note, the binary value which determines the port/clock mode of operation of data processing system 10 may be overwritten with data written to D[3] integrated circuit terminal 75 by an external device such as external device 11. If external device 11 does not provide a value to the D[3] integrated circuit terminal 75, the binary value of %0 is output and weakly driven from buffer 534. Subsequently, the binary value of %0 is provided to and stored in the Clock mode bit of configuration register 50 via External Control bus 62. From configuration register 50, this value is used to configure data processing system to configured a preselected integrated circuit terminal to operate as a port terminal (Port E[4]).

In contrast, assume external device 11 does provide a value to D[3] integrated circuit terminal 75 which indicates an external user wants data processing system 10 to configure the preselected integrated circuit terminal as a Clock Out terminal rather than a port terminal. Therefore, D[3] integrated circuit terminal 75 provides a binary value of %1 to indicate data processing system should be configured as a Clock Out terminal. In this instance, the binary value of %0 is still output and weakly driven from buffer 534. However, the weakly driven value of %0 is overwritten by the binary value of %1 provided by D[3] integrated circuit terminal 75. The value provided by D[3] integrated circuit terminal 75 overrides the value driven by the weak driver, buffer 534. Subsequently, the binary value of %1 is provided to and stored in the Clock mode bit of configuration register 50 via External Data bus 64. From configuration register 50, this value is used to configure data processing system to configure the preselected circuit terminal as a Clock Out terminal.

The present invention allows a user to overwrite all, none, or merely a portion of the default configuration data provided by mask register 40. Such flexibility allows an external user to only provide external circuitry for a portion of integrated circuit pins which should be externally driven to implement a system desired by that external user. Thus, it should be emphasized that the present invention allows the external user to use a default configuration value programmed into mask register 40. Additionally, a portion of the default configuration value may be overwritten by an externally provided configuration value. However, it should be emphasized that not all of the default configuration value must be overwritten.

Therefore, if a user wants to configure data processing system 10 from internal mask register 40, the user should not provide data to the plurality of bus terminals 48 and overwrite the default configuration value provided by mask register 40. If not driven by an external device, configuration register 50 is set internally to correspond to the default configuration value stored in mask register 40. The contents of mask register 40 are stored during a fabrication phase of the manufacturing process of data processing system 10. A customer which uses data processing system 10 specifies the values to be programmed into mask register 40 during the fabrication process of the data processor. If the default configuration value is to be used, a user of data processing system 10 is not required to provide the external device to set the reset configuration data to the plurality of bus terminals 48 during the reset operation and, therefore, both hardware overhead costs and time are saved.

Alternatively, if the user wants to partially configure data processing system 10 using data provided by external Bus 28 via the plurality of bus terminals 48, the user should set an appropriate one of the plurality of bus terminals 48 to a predetermined logic state during a reset operation. Such an alternative method for configuring data processing system 10 allows the user to have flexibility in establishing any desired reset configuration during reset. Optionally, the default reset configuration may be driven from external integrated bus terminals 48 for applications such as production testing, development systems, prototypes, and for users who purchase data processors which may not have the required default reset configuration for their application.

Furthermore, in the present invention, the contents of configuration register 50 become visible to an external user on the plurality of integrated circuit terminals 28. This is extremely useful in development systems and for test applications.

In conclusion, the present invention provides an internal mask programmable register which determines a default configuration of a data processor during a reset operation. During a reset operation, a configuration of the data processor would be determined because a first operation after reset may enable the data processor to function differently in different configurations. In the present invention, a default reset configuration of a data processor is taken from the programmable mask register unless the default reset configuration is overridden by values written to the integrated circuit pins of the data processing system. The default reset configuration includes information for controlling a mode of operation, a clock configuration, a size configuration, and a port configuration.

The combined use of the mask programmable register and the ability to override a default configuration determined by the mask programmable register makes the present invention more cost effective than prior art implementations. For example, high volume users may eliminate external circuitry required to drive configuration data during execution of a reset operation and, therefore, reduce the cost of their data processing systems. Furthermore, the mask programmable register may be implemented by the manufacturer of the processor using known technology such that the data processor may be tailored to the specifications of such high volume users.

Furthermore, the user may easily configure the data processor using both the internal mask register and external configuration values by driving desired portions of the configuration value externally to a preselected portion of the plurality of bus terminals 48. This also allows the data processor to be selectively configured to the default configuration and any other configuration which may be required for testing purposes or any other operation which requires the default configuration to be overridden. The selectivity embodied by the data processor implementing the present invention is especially useful for low volume users who can not afford the expense of having a manufacturer design a data processor tailored to their specifications. Additionally, the ability of the present invention to selectively configure the data processor is useful for those users who want to use existing data processors as prototypes or for system development.

The implementation of the invention described herein is provided by way of example only. However, many other implementations may exist for executing the function described herein. For example, in an alternate embodiment of the invention, data provided by mask register 40 may only be provided during a reset operation or the data may be driven permanently on the Mask Data bus. Additionally, an alternate signal, other than the Reset signal, may be used for the function of the multiplexing. As well, the logic circuitry illustrated in FIG. 4 may be replaced by alternate logic components which perform a similar function. Furthermore, instead of waiting for a Reset signal to be negated, a program flow control may repeat a reset operation until the Reset signal is negated. In that case the value latched in the plurality of configuration registers 50 is a last value latched before the Reset signal was negated. Additionally, in an alternate embodiment, a same signal may be used for internal reset and external reset. Furthermore, in an alternate embodiment, the data processor checks to determine if the reset value is negated before beginning execution. If reset is negated, execution based on the contents of the configuration register is initiated. If reset is asserted, a programming flow returns to test a state of the externally provided signals.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system, comprising:

a mask register for storing a first configuration value;

a plurality of bus terminals, a first portion of the plurality of bus terminals receiving a second configuration value;

a reset circuit for providing an internal reset signal to indicate the data processing system is executing a reset operation;

an external bus control circuit coupled to the reset circuit for receiving the internal reset signal and coupled to the mask register for receiving the first configuration value, the external bus control circuit providing the first configuration value; and a terminals control circuit coupled to the reset circuit for selectively receiving the internal reset signal, coupled to the external bus control circuit for receiving the first configuration value, and coupled to the plurality of bus terminals for selectively receiving the second configuration value, the terminals control circuit providing a modified configuration value wherein each bit of the modified configuration value corresponds to each bit of the first configuration value which has not been overwritten by a corresponding bit of the second configuration value provided by a corresponding portion of the plurality of bus terminals.

2. The data processing system of claim 1 further comprising:

a configuration register coupled to the reset circuit for receiving the internal reset signal and coupled to the terminals control circuit for storing the modified configuration value when the internal reset signal is asserted.

3. The data processing system of claim 2 wherein:

the bus interface unit is coupled to the configuration register for receiving the configuration data signal when the internal reset signal is asserted and the bus interface unit is configured in response to the configuration data signal to communicate a value in a preselected format.

4. The data processing system of claim 2 wherein the configuration register provides the one of the first configuration value and the second configuration value via a configuration data signal after the internal reset signal is negated.

5. The data processing system of claim 1 wherein the configuration data signal enables the data processing system to operate in a preselected mode of operation.

6. The data processing system of claim 5 wherein the preselected mode of operation is one of a slave access mode, a master test mode, an emulator mode, a master mode, and a single chip mode.

7. The data processing system of claim 1 wherein the mask register is a mask programmable read only memory.

8. The data processing system of claim 1 wherein the configuration data signal selects a function to be executed by a preselected one of the plurality of bus terminals.

9. The data processing system of claim 8 wherein the function is one of a clock output function and a port function.

10. The data processing system of claim 1 wherein the configuration data signal selects a phase lock loop mode of the data processing system.

11. The data processing system of claim 1 wherein the configuration data signal selects a size of accesses made by the data processing system.

12. The data processing system of claim 1 wherein the second data configuration value is provided by an external user of the data processing system.

13. The data processing system of claim 1 wherein the second data configuration value overwrites a bit of the first configuration value.

14. The data processing system of claim 1 wherein the second data configuration value overwrites a plurality of bits of the first configuration value.

15. The data processing system of claim 1 wherein the second data configuration value overwrites the entire first configuration value.

* * * * *